United States Patent

Yamamoto

(10) Patent No.: US 8,938,963 B2
(45) Date of Patent: Jan. 27, 2015

(54) THERMOACOUSTIC ENGINE

(75) Inventor: Yosuke Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 270 days.

(21) Appl. No.: 13/092,769

(22) Filed: Apr. 22, 2011

(65) Prior Publication Data

US 2011/0259003 A1 Oct. 27, 2011

(30) Foreign Application Priority Data

Apr. 23, 2010 (JP) ................................ P2010-099892

(51) Int. Cl.
| F02G 1/04 | (2006.01) |
| F01K 23/10 | (2006.01) |
| F25B 9/00 | (2006.01) |
| F25B 7/00 | (2006.01) |
| F25B 9/14 | (2006.01) |

(52) U.S. Cl.
CPC . *F02G 1/04* (2013.01); *F01K 23/10* (2013.01); *F25B 9/145* (2013.01); *F25B 7/00* (2013.01); *F02G 2243/54* (2013.01)
USPC ............. 60/616; 60/655; 60/517; 62/6; 62/79

(58) Field of Classification Search
CPC ............ F25B 9/14; F25B 9/145; F03G 7/002; F02G 1/04–1/057; F02G 2243/54
USPC ........... 60/531–532, 516, 530, 616–618, 655; 62/6, 467, 79, 469
See application file for complete search history.

(56) References Cited

U.S. PATENT DOCUMENTS

| 4,090,557 A | * | 5/1978 | Currier .......................... 165/110 |
| 5,275,002 A | * | 1/1994 | Inoue et al. .......................... 62/6 |
| 5,901,556 A | * | 5/1999 | Hofler .................................. 62/6 |
| 6,164,073 A | * | 12/2000 | Swift et al. ...................... 60/721 |
| 7,404,296 B2 | * | 7/2008 | Watanabe et al. .................... 62/6 |
| 7,603,866 B2 | * | 10/2009 | Watanabe et al. .................... 62/6 |
| 8,584,471 B2 | * | 11/2013 | Schwartz et al. ................... 62/6 |
| 2011/0259003 A1 | * | 10/2011 | Yamamoto ...................... 60/530 |

FOREIGN PATENT DOCUMENTS

| CN | 101608847 A | * | 12/2009 |
| JP | 2000-88378 A | | 3/2000 |
| JP | 2005-180294 A | | 7/2005 |
| JP | 2006-266571 A | | 10/2006 |
| JP | 2007-147193 A | | 6/2007 |

OTHER PUBLICATIONS

Japanese Office Action (with partial English translation) dated: Oct. 1, 2013.

* cited by examiner

*Primary Examiner* — Thomas Denion
*Assistant Examiner* — Laert Dounis
(74) *Attorney, Agent, or Firm* — Westerman, Hattori, Daniels & Adrian, LLP

(57) ABSTRACT

A thermoacoustic engine includes a first stack and a second stack disposed in a gas-filled looped tube. The first stack has a first end to which heat is inputted and a second end to which cooling water is inputted, and the second stack has a first end to which the cooling water is inputted after passing through the second end of the first stack, and a second end provided with a cooling device. The thermoacoustic engine further includes a flow controller for controlling the flow rate of the cooling water to be inputted to the second end of the first stack.

6 Claims, 2 Drawing Sheets

THERMOACOUSTIC ENGINE

FIELD OF THE INVENTION

The present invention relates to a thermoacoustic engine having two stacks embedded in a gas-filled looped tube such that heat inputted to the first stack is recovered by the second stack via sound power induced by the first stack and propagating to the second stack.

BACKGROUND OF THE INVENTION

Thermoacoustic engines are known as a device for recovering heat (exhaust heat) of a heat source. A typical example of such known thermoacoustic engines is disclosed in Japanese Patent Application Laid-Open Publication (JP-A) No. 2000-88378. The disclosed thermoacoustic engine includes a stack and a heat storage unit that are embedded in a gas-filled looped tube, and a hot-side heat exchanger and a cold-side heat exchanger that are disposed on opposite sides of each of the stack and the heat storage unit.

In order to recover exhaust heat from a heat source, the hot-side heat exchanger associated with the stack is heated with heat supplied from the heat source, while the cold-side heat exchanger associated with the stack and the cold-side heat exchanger associated with the heat storage unit are cooled. Due to a temperature gradient created across the stack, the gas in the stack undergoes self-exited oscillation and the stack induces a sound wave. The sound wave propagates through the gas to the heat storage unit, thereby heating the hot-side heat exchanger associated with the heat storage unit. The exhaust heat of the heat source is thus recovered.

Since the thermoacoustic engine disclosed in JP 2000-88378 A has only one stack in the looped tube, the efficiency of converting heat energy (exhaust heat of the heat source) to acoustic power is relatively low.

Various exhaust heats, such as engine exhaust heat and boiler exhaust heat, can be used as the heat source for the thermoacoustic engine. However, such exhaust heats are not constant in temperature. Furthermore, if the exhaust heat is near room temperature, efficient recovery of the exhaust heat by the conventional thermoacoustic engine is practically impossible.

It is an object of the present invention to provide a thermoacoustic engine which is capable of recovering heat with high efficiencies even when temperature of heat from a heat source is relatively low.

SUMMARY OF THE INVENTION

According to the present invention, there is provided a thermoacoustic engine, comprising: a looped tube filled with a gas; a first stack and a second stack disposed in the looped tube, wherein the first stack has a first end to which heat is inputted and a second end opposite to the first end and to which cooling water is inputted, and the second stack has a first end to which the cooling water is inputted after the cooling water has passed through the second end of the first stack, and a second end opposite to the first end and provided with a cooling device; a cooling water passage for guiding the cooling water to the second end of the first stack; and a flow controller disposed on the cooling water passage for controlling the flow rate of the cooling water.

By virtue of the flow controller disposed on the cooling water passage, it is possible to adjust the flow rate of cooling water to be supplied to the second end of the first stack and the first end of the second stack in such a manner as to accommodate variations of the amount of heat of the heat source. With this flow rate control or adjustment, the heat of the heat source can be recovered with improved efficiency.

Preferably, the first end of the first stack and the first end of the second stack are opposed to each other and connected together by a hot water passage. With this arrangement, since a sound wave energy induced by the first stack is injected to the first end (hot-side end) of the second stack while the cooling water after passing through the second end (cold-side end) of the first stack is supplied to the first end of the second stack, the cooling water is further heated through the conversion of sound wave energy to heat energy occurring at the first end of the second stack.

Preferably, the flow controller controls the flow rate of the cooling water such that the ratio of a temperature of the first end of the first stack to a temperature of the second end of the first stack is equal to the ratio of a temperature of the first end of the second stack and a temperature of the second end of the second stack. By thus controlling the temperature ratios of both ends of the first and second stacks, it is no longer necessary to keep the temperature of the first end (hot-side end) of the second stack at a constant value. This will allow for the use of a single device such as a pump as the flow controller, achieving structural simplification and cost reduction of the thermoacoustic engine.

BRIEF DESCRIPTION OF THE DRAWINGS

A preferred embodiment of the present invention will be described in detail below, by way of example only, with reference to the accompanying sheets of drawings, in which.

DETAILED DESCRIPTION OF THE PREFERRED EMBODIMENT

Figure 1:
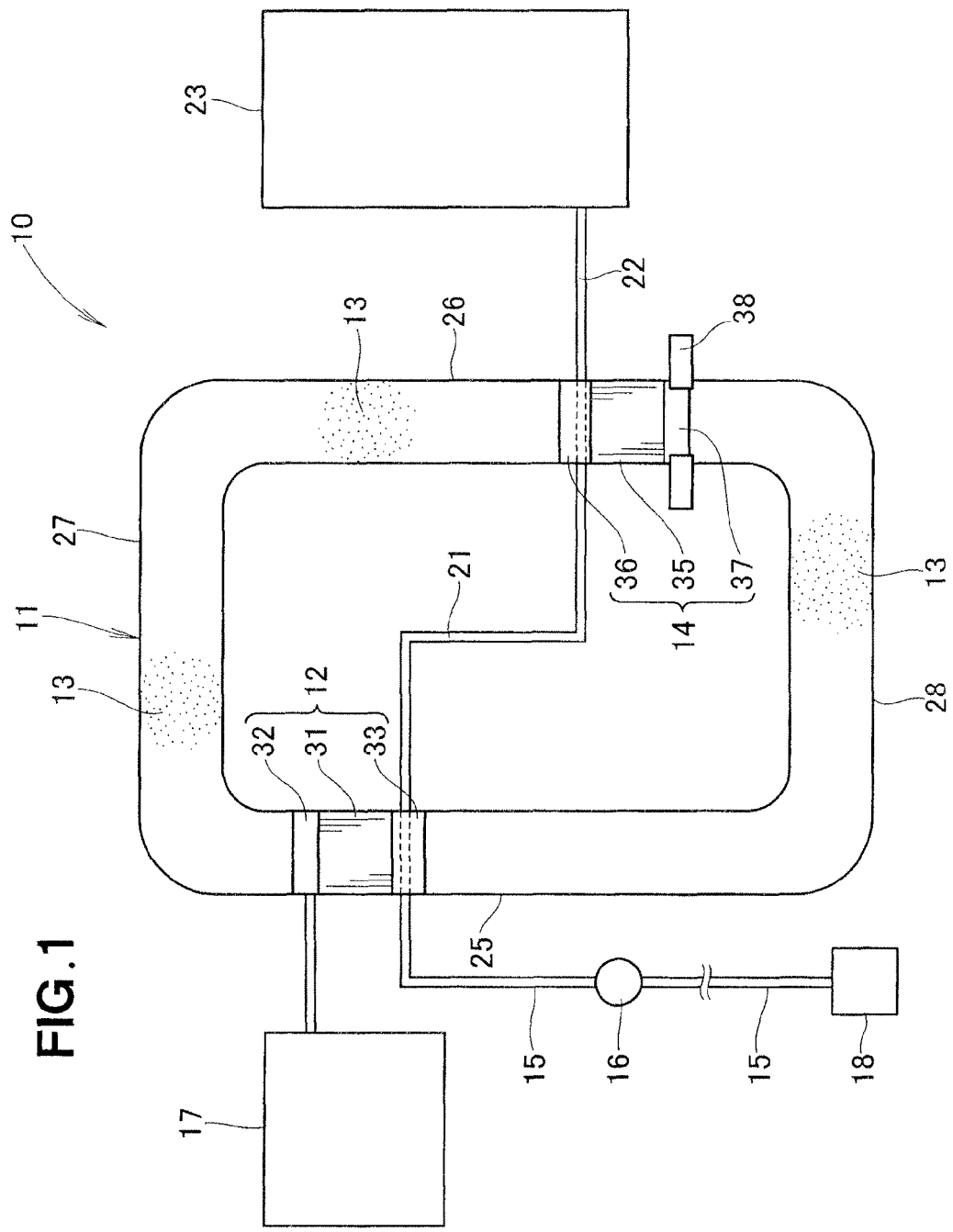
FIG. 1 is a diagrammatical view showing the general configuration of a thermoacoustic engine according to a preferred embodiment of the present invention.

A thermoacoustic engine according to a preferred embodiment of the present invention will be described below with reference to FIG. 1. As shown in this figure, the thermoacoustic engine 10 takes the form of a looped tube type thermoacoustic engine and comprises an endless or looped tube 11 filled with a gas 13, a thermal acoustic generator 12 disposed in the looped tube 11 for inducing a sound wave upon application of external heat, a heat storage unit 14 disposed in the looped tube 11 for converting acoustic energy to heat energy to thereby recover heat upon injection of the sound wave propagating from the thermal acoustic generator 12, a cooling water passage 15 for guiding cooling water to the thermal acoustic generator 12, and a single flow control means or controller 16 disposed on the cooling water passage 15 for controlling flow rate of the cooling water. In the context of the claim language, the thermal acoustic generator 12 and the heat storage unit 14 may be also referred to as "first stack 12" and "second stack 14", respectively.

The looped tube 11 is a circular cross-section tube made of stainless steel and has a generally rectangular frame-shaped configuration including a pair of parallel spaced vertical tube parts 25, 26 and a pair of parallel spaced horizontal tube parts 27, 28. The looped tube 11 is filled with an inert gas, such as nitrogen, helium, argon, or a mixture of helium and argon.

The thermal acoustic generator 12 is inserted in the left vertical tube part 25 of the looped tube 11. The thermal acoustic generator 12 includes a first stack element 31, a first hot-side heat exchanger 32 disposed on one end (upper end in FIG. 1) of the first stack element 31, and a first cold-side heat exchanger 33 disposed on an opposite end (lower end in FIG. 1) of the first stack element 31. The first hot-side heat exchanger 32 constitutes a first end of the thermal acoustic generator (first stack) 12, and the cold-side heat exchanger 33 constitutes a second end of the thermal acoustic generator (first stack) 12.

The first stack element 31 is composed of a multiplicity of thin plates arranged in a lattice-like structure or a honeycomb structure within the left vertical tube part 25 and has a number of very small parallel channels defined between the thin plates and extending in an axial direction of the left vertical tube part 25 of the looped tube 11. The thin plates are made of stainless steel or ceramics.

The first hot-side heat exchanger 32 is composed of a multiplicity of thin plates arrayed at very small intervals. The first hot-side heat exchanger 32 is connected to a heat source 17, such as an internal combustion engine. Thus, the first hot-side heat exchanger 32 is heated to a high temperature (mean temperature) $T_1$ by the heat (exhaust heat) of the heat source 17.

Like the first hot-side heat exchanger 32, the first cold-side heat exchanger 33 is composed of a multiplicity of thin plates arrayed at very small intervals. The first cold-side heat exchanger 33 is connected via the cooling water passage 15 to a cooling water supply source 18. The flow controller 16 is located at a longitudinally intermediate portion of the cooling water passage 15. The first cold-side heat exchanger 33 is cooled to a temperature (mean temperature) $T_2$ which is the temperature of cooling water supplied from the cooling water supply source 18.

Since the first hot-side heat exchanger 32 is heated by the heat of the heat source 17 to the temperature $T_1$ while the first cold-side heat exchanger 33 is cooled to the temperature $T_2$ by the cooling water, a predetermined large temperature difference is produced between opposite ends of the first stack element 31. The temperature difference creates a predetermined temperature gradient between the walls of each channel of the first stack element 31. Due to the temperature gradient thus created, the gas 14 in the very small parallel channels of the first stack 31 undergoes oscillations and the first stack element 31 induces a sound wave propagating around the looped tube 11.

The heat storage unit 14 is inserted in the right vertical tube part 26 of the looped tube 11. The heat storage unit 14 includes a second stack element 35, a second hot-side heat exchanger 36 disposed on one end (upper end in FIG. 1) of the second stack element 35, and a second cold-side heat exchanger 37 disposed on an opposite end (lower end in FIG. 1) of the second stack element 35. The second hot-side heat exchanger 36 constitutes a first end of the heat storage unit (second stack) 14, and the cold-side heat exchanger 37 constitutes a second end of the heat storage unit (second stack) 14.

The second stack element 35 is composed of a multiplicity of thin plates arranged in a lattice-like structure or a honeycomb structure within the right vertical tube part 26 and has a number of very small parallel channels defined between the thin plates and extending in an axial direction of the right vertical tube part 26 of the looped tube 11. The thin plates are made of stainless steel or ceramics.

The second hot-side heat exchanger 36 is composed of a multiplicity of thin plates arrayed at very small intervals. The second hot-side heat exchanger 36 is connected via a first hot water passage 21 to the first cold-side heat exchanger 33 of the thermal acoustic generator 12. The second hot-side heat exchanger 36 is also connected via a second hot water passage 22 to a hot water tank 23. The first hot water passage 21 is connected via the first cold-side heat exchanger 33 to the cooling water passage 15. The hot water tank 23 is provided to recover the heat (exhaust heat) of the heat source 17 as it retrains hot water heated by the thermoacoustic engine 10.

The cooling water is introduced through the cooling water passage 15 into the first cold-side heat exchanger 33 where the cooling water is heated by heat released from the first cold-side heat exchanger 33. The thus heated cooling water (hot water) is subsequently introduced through the first hot water passage 21 into the second hot-side heat exchanger 36 where the hot water is further heated by heat released from the second hot-side heat exchanger 36. Thereafter, the reheated hot water is introduced through the second hot water passage 22 into the hot water tank 23.

Like the second hot-side heat exchanger 36, the second cold-side heat exchanger 37 is composed of a multiplicity of thin plates arrayed at very small intervals. The second cold-side heat exchanger 37 is provided with a cooling device such as cooling fin 38. By the heat exchange achieved when heat of the second cold-side heat exchanger 37 is radiated via the cooling fin (cooling device) 38 to the atmosphere, the second cold-side heat exchanger 37 is cooled to a temperature $T_4$.

With this arrangement, when the sound wave (acoustic oscillations) induced by the thermal acoustic generator (first stack) 12 is injected into the heat storage unit 14 while the second cold-side heat exchanger 37 is cooled to the temperature $T_4$ by means of the cooling fin 38, the gas in the very small channels in the second stack element 35 undergoes oscillations and heats the second hot-side heat exchanger 36 to a temperature $T_3$ via the conversion of the acoustic energy to the heat energy.

In the thermoacoustic engine 10, the thermal acoustic generator 12 and the heat storage unit 14 are disposed in the looped tube 11 in such a manner that a sound wave (acoustic oscillations) induced by the thermal acoustic generator 12 propagates around the looped tube 12 in a direction from the first hot-side heat exchanger 32 of the thermal acoustic generator 12 to the second hot-side heat exchanger 36 of the heat storage unit 14. To this end, the hot-side heat exchanger (first end) 32 of the thermal acoustic generator (first stack) 12 and the hot-side heat exchanger (first end) 36 of the heat storage unit (second stack) 14 are opposed to each other with respect to the propagating direction of the sound wave.

The flow controller 16 controls the flow rate of cooling water flowing through the cooling water passage 15 so as to ensure that the ratio of a temperature $T_1$ of the first hot-side heat exchanger 32 to a temperature $T_2$ of the first cold-side heat exchanger 33 is equal to the ratio of a temperature $T_3$ of the second hot-side heat exchanger 36 to a temperature $T_4$ of the second cold-side heat exchanger 37 ($T_1/T_2=T_3/T_4$), where $T_1>T_3 \geq T_2>T_4$.

Figure 2:
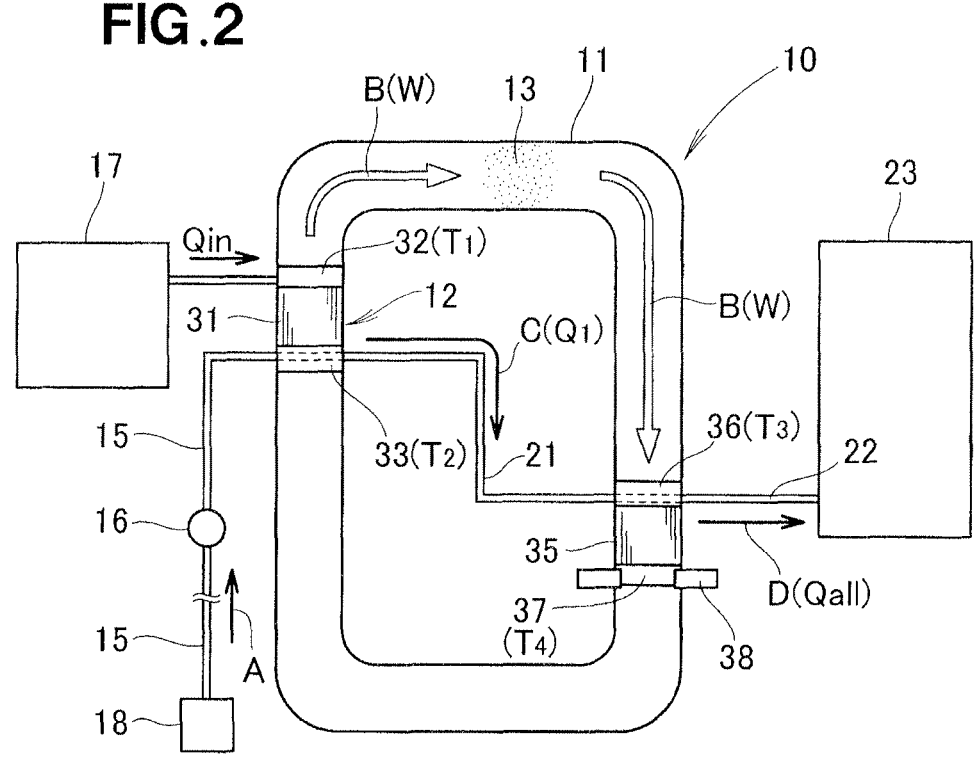
FIG. 2 is a diagrammatical view illustrative of the manner in which heat inputted to one stack is recovered by another stack of the thermoacoustic engine.

Next, a heat recovery operation of the thermoacoustic engine 10 will be described with reference to FIG. 2. As shown in FIG. 2, heat Qin is inputted to the first hot-side heat exchanger 32 of the thermal acoustic generator 12 so that the first hot-side heat exchanger 32 is heated by the input heat Qin to a temperature $T_1$. At the same time, cooling water of the cooling water supply source 18 is introduced via the cooling water passage 15 into the first cold-side heat exchanger 33 of the thermal acoustic generator 12, as indicated by the arrow A, so that the first cold-side heat exchanger 33 is cooled by the cooling water to a temperature $T_2$.

Since the first hot-side heat exchanger 32 is heated to the temperature $T_1$ while the first cold-side heat exchanger 33 is cooled to the temperature $T_2$, a predetermined large temperature differences is created across the first stack element 31 and a sound wave is induced by the first stack element 31 due to oscillations of the gas in the very small channels of the first stack element 31. The thus induced sound wave propagates along the looped tube 11 in a direction from the first hot-side heat exchanger 32 to the second hot-side heat exchanger 36 of the heat storage unit 14, as indicated by the arrow B. In this instance, the heat Qin of the heat source 17 is partly converted into acoustic energy W, which can be obtained by formula (1) below.

$$W = \frac{T_1 - T_2}{T_1} Qin \qquad (1)$$

The remaining heat $Q_1$ which has not converted into the acoustic energy is transferred to the cooling water, thereby heating the cooling water. The heat $Q_1$ transferred to the cooling water is obtained by formula (2) below.

$$Q_1 = \frac{T_2}{T_1} Qin \qquad (2)$$

Hot water thus produced by the first hot-side heat exchanger 33 is introduced via the first hot water passage 21 to the second hot-side heat exchanger 36 of the heat storage unit 14. This means that the remaining heat $Q_1$ is inputted to the second hot-side heat exchanger 36 of the heat storage unit 14, as indicated by the arrow C.

In this instance, because the second cold-side heat exchanger 37 is cooled by the cooling fin 38 to a temperature $T_4$, the sound wave propagated into the heat storage unit 14 causes oscillations of gas in the second stack element 35, which will transfer heat to the second hot-side heat exchanger 36, heating the second hot-side heat exchanger 35 to a temperature $T_3$. By thus heating the second hot-side heat exchanger to the temperature $T_3$, the hot water introduced via the first hot water passage 21 into the second hot-side heat exchanger 36 is further heated. In this instance, the amount of heat $Q_2$ which is transferred to the hot water at the heat storage unit 14 can be obtained by formula (3) below.

$$Q_2 = \frac{T_3}{T_3 - T_4} W \qquad (3)$$

Thus, the total heat Qall that is transferred to the cooling water in the thermoacoustic engine 10 can be obtained by formula (4) below.

$$Qall = Q_1 + Q_2 = \left(\frac{T_2}{T_1} + \frac{T_3}{T_3 - T_4} \frac{T_1 - T_2}{T_1}\right) Qin \qquad (4)$$

The hot water thus heated by the second hot-side heat exchanger 36 is then introduced through the second hot water passage 22 into the hot water tank 23, as indicated by the arrow D. The heat (exhaust heat) of the hat source 17 can thus be recovered as the hot water is stored in the hot water tank 23.

In formula (4), if $T_4=0°$ C., we will obtain the following.

$$\frac{T_3}{T_3 - T_4} = 1$$

Thus, the total heat Qall that is transferred to the cooling water in the thermoacoustic engine 10 can be represented by the following.

$$Qall = \left(\frac{T_2}{T_1} + 1 \frac{T_1 - T_2}{T_1}\right) Qin$$
$$= Qin$$

On the other hand, in formula (4), if $T_4>0°$ C., we will obtain the following.

$$\frac{T_3}{T_3 - T_4} > 1$$

Thus, the total heat Qall that is transferred to the cooling water in the thermoacoustic engine 10 can be represented by the following.

Qall>Qin

More concretely, if $T_1=200°$ C., $T_2=85°$ C., $T_3=88°$ C. and $T_4=37°$ C., by substituting these temperatures in formula (4), we can obtain the following.

$$Qall = \left(\frac{85}{200} + \frac{88}{88 - 37} \frac{200 - 85}{200}\right) Qin$$
$$= 1.4 Qin$$

It will be appreciated from the forgoing that the heat Qall which is 1.4 times the heat (exhaust heat) Qin of the heat source 17 can be stored in the hot water tank 23.

Next, a description will be made about an operation of the flow controller 16, which is performed in order to equalize the first temperature ratio ($T_1/T_2$) and the second temperature ratio ($T_3/T_4$). In order to recover the heat (exhaust heat) of the heat source 17 at high efficiency, it is desirable that the ratio of a temperature 71 of the first hot-side heat exchanger 32 to a temperature $T_2$ of the first cold-side heat exchanger 33 be equal to the ratio of a temperature $T_3$ of the second hot-side heat exchanger 36 and a temperature $T_4$ of the second cold-side heat exchanger 37 ($T_1/T_2=T_3/T_4$).

If the heat (exhaust heat) of the heat source 17, which is inputted to the first hot-side heat exchanger 32, varies, the desired temperature ratio relation ($T_1/T_2=T_3/T_4$) cannot be obtained. In practice, it may occur that the heat of the heat source rises or falls and, hence, the temperature ratio relation changes to $T_1/T_2>T_3/T_4$ or $T_1/T_2<T_3/T_4$. Thus, the flow controller 16 is provided for controlling the flow rate of cooling water so as to realize the desired temperature ratio relation ($T_1/T_2=T_3/T_4$).

If the temperature ratio relation changes to $T_1/T_2>T_3/T_4$ due to variation in the heat of the heat source 17, the flow controller 16 operates to reduce the flow rate of the cooling water flowing through the cooling water passage 15. By thus reducing the flow rate, the temperature $T_2$ of the first cold-side heat exchanger 33 and the temperature $T_3$ of the second hot-side heart exchanger 36 rise. Thus, the first temperature ratio ($T_1/T_2$) becomes small, while the second temperature ratio ($T_3/T_4$) becomes large. The relation of the first and second temperature ratios approaches $T_1/T_2=T_3/T_4$.

Alternatively, if the temperature ratio relation changes to $T_1/T_2<T_3/T_4$ according to variation in the heat of the heat source 17, the flow controller 16 operates to increase the flow rate of the cooling water flowing through the cooling water passage 15. By thus increasing the flow rate, the temperature $T_2$ of the first cold-side heat exchanger 33 and the temperature $T_3$ of the second hot-side heart exchanger 36 fall. Thus, the first temperature ratio ($T_1/T_2$) becomes large, while the second temperature ratio ($T_3/T_4$) becomes small. The relation of the first and second temperature ratios approaches $T_1/T_2=T_3/T_4$.

By virtue of a single flow controller 16 disposed on the cooling water passage 15, the flow rate of cooling water to be supplied to the heat exchangers 33, 36 of the first and second stacks 12, 14 can be adjusted to cancel out or accommodate variations of the amount of heat (exhaust heat) of the heat source 17. Thus, the heat of the heat source can be recovered reliably and highly efficiently. Furthermore, by controlling the temperature ratios of both ends of the first and second stacks 12, 14, it is no longer necessary for the temperature of the hot-side heat exchanger 36 of the second stack 14 to be kept at a constant value. This will allow for the use of a single device such as a pump as the flow controller while performing the function of circulating the old water. Thus, the entire thermoacoustic engine 10 is relatively simple in construction and can be manufactured less costly.

One preferred structural embodiments of the present invention has been disclosed and described in conjunction with the thermoacoustic engine 10. The present invention should by no means be limited to the illustrated embodiment but various minor changes and modifications are possible in the light of the above teaching. For example, as for parts of the thermoacoustic engine 10, including the looped tube 11, thermal acoustic generator 12, heat storage unit 14, cooling water passage 15, flow controller 16, first hot water passage 21, first and second stack elements 31, 35, and hot-side and cold-side heat exchangers 32, 36 and 33, 37, the shape and configuration is not limited to the one shown in the illustrated embodiment but may be changed where appropriate. It is to be understood that within the scope of the appended claims the present invention may be practiced otherwise than as specifically described.

What is claimed is:

1. A thermoacoustic engine, comprising:
a looped tube filled with a gas;
a first stack and a second stack disposed in the looped tube,
wherein the first stack has a first end to which heat is inputted and a second end opposite to the first end and to which cooling water is inputted,
wherein the second stack has a first end to which the cooling water having passed through the second end of the first stack is inputted and a second end opposite to the first end and provided with a cooling device,
wherein the first stack comprises a first stack element disposed between a first hot side heat exchanger and a first cold side heat exchanger, the first hot side heat exchanger constituting the first end of the first stack and the first cold side heat exchanger constituting the second end of the first stack,
wherein the second stack comprises a second stack element disposed between a second hot side heat exchanger and a second cold side heat exchanger, the second hot side heat exchanger constituting the first end of the second stack and the second cold side heat exchanger constituting the second end of the second stack, and
wherein the first hot side heat exchanger constituting the first end of the first stack and the second hot side heat exchanger constituting the first end of the second stack are opposed to each other;
a cooling water passage for guiding the cooling water to the first cool side heat exchanger constituting the second end of the first stack;
a flow controller disposed on the cooling water passage for controlling the flow rate of the cooling water; and
a hot water passage connecting the first cold side heat exchanger of the first stack and the second hot side heat exchanger of the second stack and guiding the cooling water from the first cold side heat exchanger to the second hot side heat exchanger such that the cooling water supplied to the first cold side heat exchanger of the first stack is heated by heat released from the first cold side heat exchanger of the first stack and the thus heated cooling water is subsequently guided to the second hot side heat exchanger and reheated by heat released from the second hot side heat exchanger of the second stack,
wherein the flow controller regulates the flow rate of the cooling water flowing successively through the cooling water passage and the hot water passage to raise or lower temperatures of the first cool side heat exchanger and the second hot side heat exchanger to maintain a condition that a first ratio of a temperature of the first end of the first stack to a temperature of the second end of the first stack is equal to a second ratio of a temperature of the first end of the second stack to a temperature of the second end of the second stack.

2. The thermoacoustic engine according to claim 1, wherein the first stack element comprises a plurality of plates and plurality of parallel channels, wherein the plurality of parallel channels are defined between the plates and extend in an axial direction.

3. The thermoacoustic engine according to claim 1, wherein the second stack element comprises a plurality of plates and plurality of parallel channels, wherein the plurality of parallel channels are disposed between the plates and extend in an axial direction.

4. The thermoacoustic engine according to claim 1, further comprising a cooling water supply source in communication with the cooling water passage.

5. The thermoacoustic engine according to claim 1, further comprising a hot water tank in communication with the second stack via a second hot water passage connected to the second hot side heat exchanger of the second stack.

6. The thermoacoustic engine according to claim 5, wherein the cooling water reheated by the heat released from the second hot side heat exchanger of the second stack is introduced to the hot water tank via the second hot water passage.

* * * * *